Figure 1:
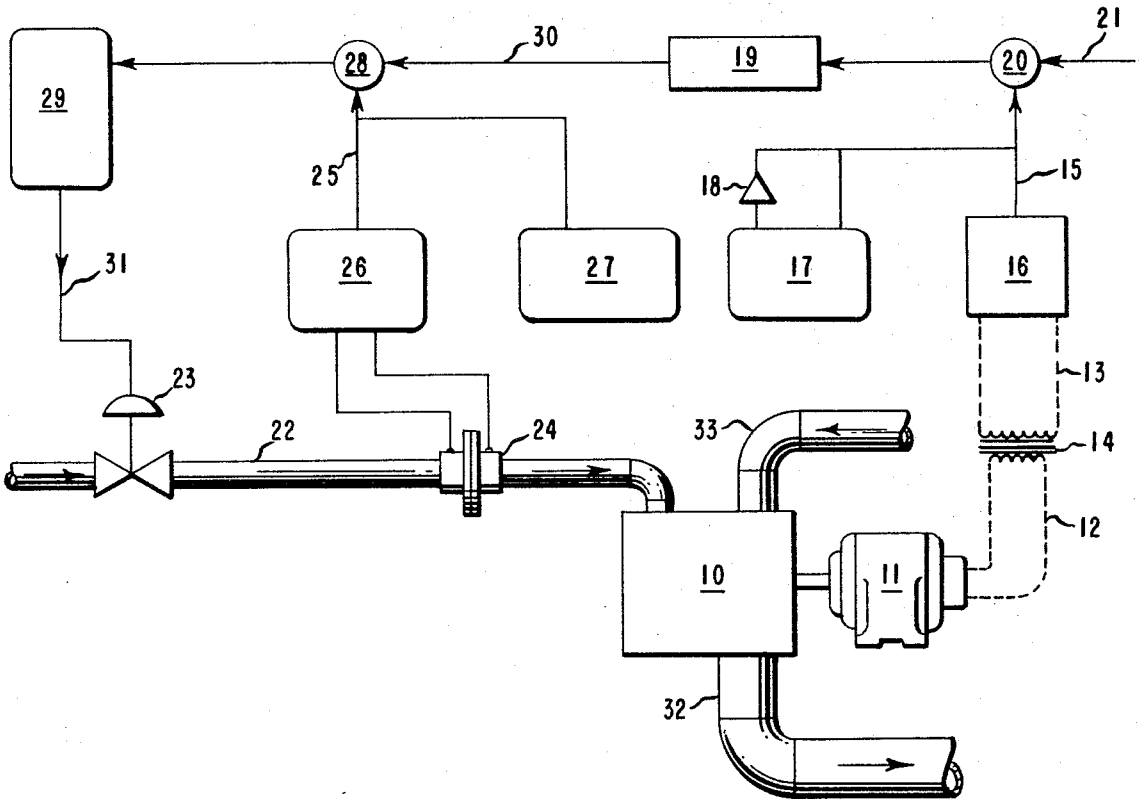
Figure 2:
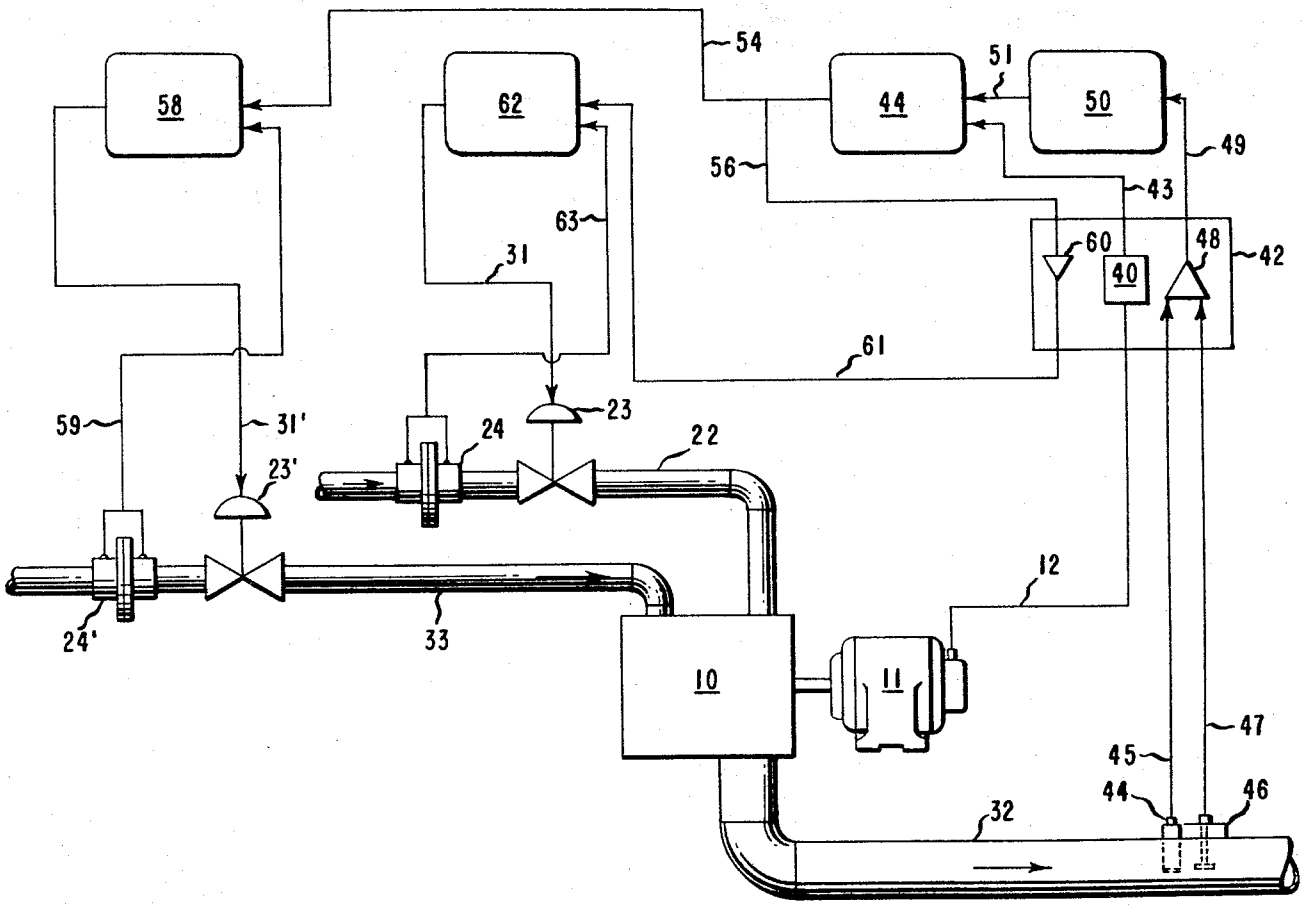

T861005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 1, 1969

861 O.G. 17

723,407

METHOD AND APPARATUS FOR AUTOMATICALLY CONTROLLING VISCOSITY IN A POLYMERIZATION PROCESS

Rolando Aldo Cecchini, Brockville, Ontario, Canada, assignor, by mesne assignments, to E. I. du Pont de Nemours and Company, Wilmington, Del., a corporation of Delaware

Filed Apr. 23, 1968. Published Apr. 1, 1969
Class 117—92
2 Sheets Drawing. 13 Pages Specification

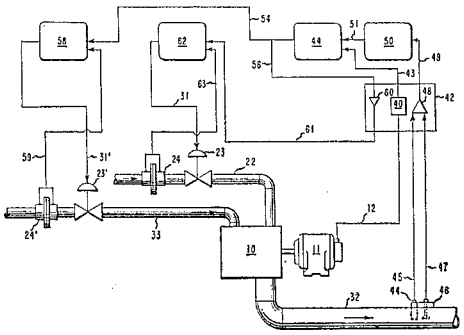

A method and apparatus for automatically controlling viscosity in a continuous polymerization process wherein viscosity is changed by regulating by means of a control valve, the flow of an additive to the polymer solution that is being continuously mixed in a vessel by a mixing blade driven at a constant speed by an electric motor. A control signal system is coupled between the motor and the control valve for detecting changes in motor load corresponding to changes in viscosity and generating signals proportional to those changes. These signals are fed to the control valve to operate it and in turn regulate the flow of additive into the polymer.

T861005

April 1, 1969 R. A. CECCHINI DEF. PUB.

METHOD AND APPARATUS FOR AUTOMATICALLY CONTROLLING VISCOSITY IN A POLYMERIZATION PROCESS

SN _ 723407

Filed April 23, 1968 Sheet 1 of 2

INVENTOR
ROLANDO ALDO CECCHINI

BY Howard P. West Jr.
ATTORNEY

T861005

April 1, 1969 R. A. CECCHINI DEF. PUB.

METHOD AND APPARATUS FOR AUTOMATICALLY CONTROLLING VISCOSITY IN A POLYMERIZATION PROCESS SN - 723407

Filed April 23, 1968 Sheet 2 of 2

INVENTOR
ROLANDO ALDO CECCHINI

BY Howard P. West Jr.
ATTORNEY